(12) United States Patent
Horiike

(10) Patent No.: US 8,915,811 B2
(45) Date of Patent: Dec. 23, 2014

(54) CONTINUOUSLY VARIABLE TRANSMISSION

(75) Inventor: Teruyoshi Horiike, Fuji (JP)

(73) Assignee: Jatco Ltd, Fuji-shi (JP)

( * ) Notice: Subject to any disclaimer, the term of this patent is extended or adjusted under 35 U.S.C. 154(b) by 376 days.

(21) Appl. No.: 13/514,416

(22) PCT Filed: Sep. 9, 2010

(86) PCT No.: PCT/JP2010/065995
§ 371 (c)(1),
(2), (4) Date: Jun. 7, 2012

(87) PCT Pub. No.: WO2011/070833
PCT Pub. Date: Jun. 16, 2011

(65) Prior Publication Data
US 2012/0244973 A1   Sep. 27, 2012

(30) Foreign Application Priority Data
Dec. 11, 2009   (JP) .................................. 2009-281588

(51) Int. Cl.
*F16H 55/56* (2006.01)
*F16H 37/02* (2006.01)

(52) U.S. Cl.
CPC .................................. *F16H 37/021* (2013.01)
USPC ............................................................. 474/8

(58) Field of Classification Search
CPC ...................................................... F16H 37/021
USPC ........................................................ 474/8–29
See application file for complete search history.

(56) References Cited

U.S. PATENT DOCUMENTS

| | | | |
|---|---|---|---|
| 3,686,967 A | 8/1972 | Beneke | |
| 4,530,256 A | 7/1985 | Hattori | |
| 4,740,191 A * | 4/1988 | Takano et al. | 474/69 |
| 5,720,686 A | 2/1998 | Yan et al. | |
| 5,904,633 A * | 5/1999 | Lee | 475/210 |
| 7,243,564 B2 * | 7/2007 | Chonan et al. | 74/329 |

FOREIGN PATENT DOCUMENTS

| | | |
|---|---|---|
| EP | 0 239 124 A2 | 9/1987 |
| FR | 2 520 826 A1 | 8/1983 |
| JP | 56-094058 A | 7/1981 |
| JP | 63-047560 A | 2/1988 |
| JP | 03-056762 A | 3/1991 |
| JP | 2000-130548 A | 5/2000 |
| JP | 2001-056045 A | 2/2001 |
| JP | 2001-330095 A | 11/2001 |

OTHER PUBLICATIONS

D. L. Carter, "Improved Forward Reverse Gearbox", Xerox Disclosure Journal, Xerox Corporation, Stamford, Connecticut, U.S., vol. 23, No. 5, Sep. 1, 1998, pp. 193-196.

* cited by examiner

*Primary Examiner* — William E Dondero
*Assistant Examiner* — Robert T Reese
(74) *Attorney, Agent, or Firm* — Foley & Lardner LLP

(57) ABSTRACT

A continuously variable transmission includes a first shaft integrally rotatably coupled to a primary pulley, a second shaft integrally rotatably coupled to the secondary pulley, a first gear mounted on the first shaft and relatively rotatable with respect to the first shaft, a second gear fixed on the second shaft and engaged with the first gear, a forward clutch for coupling an engine and the first shaft, and a reverse clutch for coupling the engine and the first gear.

6 Claims, 6 Drawing Sheets

CONTINUOUSLY VARIABLE TRANSMISSION

TECHNICAL FIELD

The present invention relates to a continuously variable transmission for continuously changing a speed ratio by mounting an endless flexible member (belt, chain) between a pair of pulleys and changing groove widths of the pulleys.

BACKGROUND TECHNOLOGY

A forward/reverse switching mechanism composed of a planetary gear mechanism and a plurality of clutches is provided at an input side of a continuously variable transmission (hereinafter, referred to as a "CVT"). Forward/reverse switching of a vehicle equipped with a CVT is generally performed using this forward/reverse switching mechanism.

However, in the case of using the planetary gear mechanism for forward/reverse switching, the CVT becomes longer in an axial direction and it is difficult to miniaturize the CVT. Thus, a continuously variable transmission which realizes forward/reverse switching without the use of a planetary gear mechanism is proposed in JP2001-330095A.

SUMMARY OF INVENTION

However, many gears and shafts are used in the construction of JP2001-330095A, which causes the enlargement of the CVT, a weight increase and a cost increase.

An object of the present invention is to realize forward/reverse switching without the use of a planetary gear mechanism and without increasing the number of parts in a continuously variable transmission.

According to one aspect of the present invention, a continuously variable transmission is provided which comprises a primary pulley and a secondary pulley, the groove width of which is changeable; an endless flexible member mounted between the two pulleys; a first shaft integrally rotatably coupled to the primary pulley; a second shaft integrally rotatably coupled to the secondary pulley; a first gear mounted on the first shaft and relatively rotatable with respect to the first shaft; a second gear fixed on the second shaft and engaged with the first gear; a forward clutch for coupling a power source and the first shaft; and a reverse clutch for coupling the power source and the first gear.

Further, according to another aspect of the present invention, a continuously variable transmission is provided which comprises a primary pulley and a secondary pulley, the groove width of which is changeable; an endless flexible member mounted between the two pulleys; a first shaft integrally rotatably coupled to the primary pulley and having power from a power source transmitted thereto; a second shaft integrally rotatably coupled to the secondary pulley; a first gear mounted on the first shaft and relatively rotatable with respect to the first shaft; a second gear provided on the same axis as the second shaft and relatively rotatably with respect to the second shaft and engaged with the first gear; a forward clutch for coupling the second shaft and the second gear; and a reverse clutch for coupling the power source and the first gear.

According to these aspects, forward/reverse switching is possible without the use of a planetary gear mechanism. Since the number of parts is less as compared with the conventional technology disclosed in JP2001-330095A, miniaturization, weight saving and cost reduction of the CVT are possible.

Embodiments of the present invention and advantages thereof are described in detail below with reference to the accompanying drawings.

DESCRIPTION OF EMBODIMENTS

Figure 1:
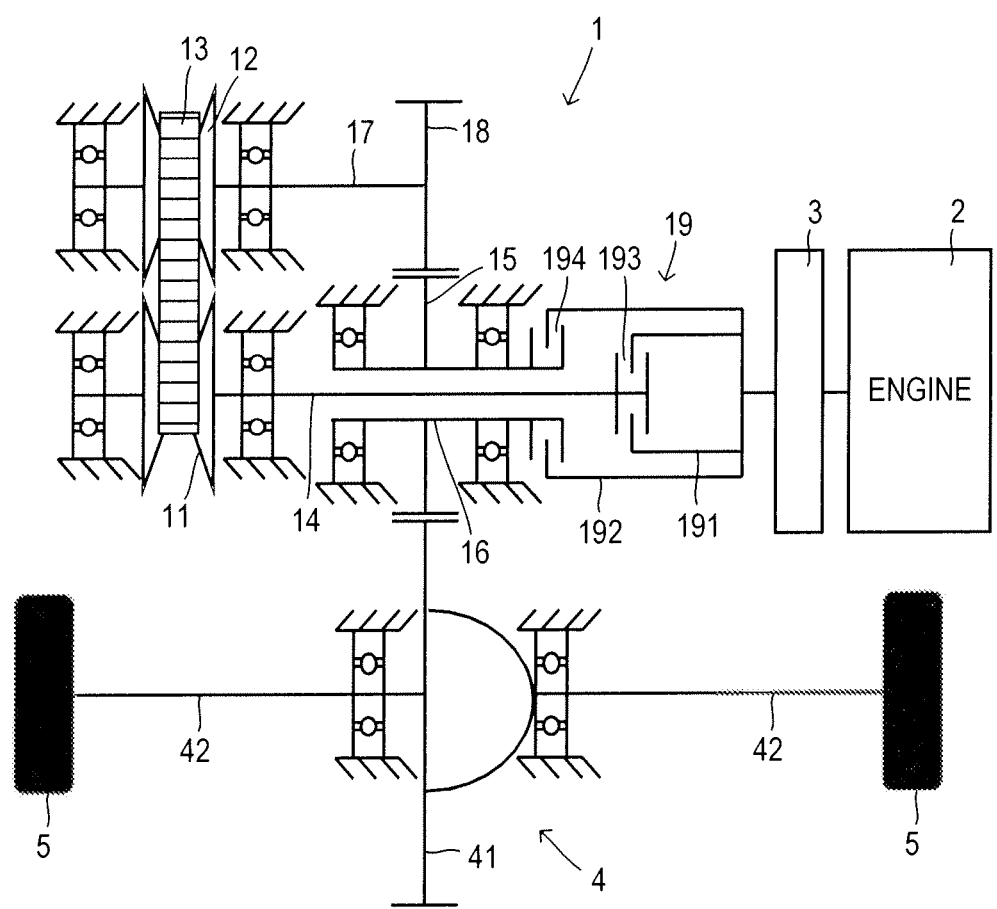
FIG. 1 is a schematic construction diagram of a vehicle equipped with a continuously variable transmission according to a first embodiment.

FIG. 1 shows a schematic construction of a vehicle equipped with a continuously variable transmission (hereinafter, referred to as a "CVT") 1 according to a first embodiment. This vehicle includes an engine 2 as a power source, and power of the engine 2 is transmitted to drive wheels 5 via a starting mechanism (e.g. torque converter) 3, the CVT 1 and a differential mechanism 4.

The CVT 1 includes a primary pulley 11, a secondary pulley 12 and a belt 13 (endless flexible member) mounted between the pulleys 11 and 12. Each of the pulleys 11, 12 is composed of a fixed conical plate and a movable conical plate arranged to face the fixed conical plate. An unillustrated hydraulic cylinder is provided on the rear surface of the movable conical plate, and the pulley can be displaced in an axial direction by extending and contracting this hydraulic cylinder. By changing the positions of the movable conical plates, the groove widths of the pulleys 11, 12 are changed to change contact radii of the belt 13 and the pulleys 11, 12, whereby a ratio of the rotation speed (speed ratio) between the primary pulley 11 and the secondary pulley 12 changes.

A first shaft 14 is integrally rotatably coupled to the primary pulley 11. The first shaft 14 is supported on a transmission case by a plurality of bearings. A first gear 15 and a hollow shaft 16 are mounted on the first shaft 14 to be relatively rotatable with respect to the first shaft 14, and the first gear 15 is fixed to the outer periphery of the hollow shaft 16. The first gear 15 functions as an output gear of the CVT 1 (a gear for outputting power to the differential mechanism 4 is defined as an "output gear" in this description). The hollow shaft 16 is supported on the transmission case by a plurality of bearings.

On the other hand, a second shaft 17 is integrally rotatably coupled to the secondary pulley 12. The second shaft 17 is supported on the transmission case by a plurality of bearings. A second gear 18 is fixed to the second shaft 17 and engaged with the first gear 15.

The first gear 15 is also engaged with a ring gear 41 of the differential mechanism 4. Power transmitted to the first gear 15 is input to the differential mechanism 4 from the ring gear 41, and distributed and transmitted to the left and right drive wheels 5 via a drive shaft 42. The drive shaft 42 is supported on a differential case by a plurality of bearings.

Further, a clutch unit 19 for switching an output rotational direction of the CVT 1, i.e. for forward/reverse switching of the vehicle is provided on the engine 2 side of the first shaft 14.

The clutch unit 19 has a double-drum structure composed of an inner drum 191 and an outer drum 192 housing the inner drum 191 inside. The inner and outer drums 191, 192 respectively have a cylindrical shape, one end of which is open and the other end of which is closed. The both drums 191, 192 are arranged on the same axis and integrally rotatably coupled at the closed ends.

A forward clutch 193 is provided at the open end of the inner drum 191 and a reverse clutch 194 is provided at the open end of the outer drum 192. A hydraulic pressure is supplied to the forward clutch 193 from an unillustrated hydraulic control circuit, for example, via an oil path formed in the inner drum 191. Further, a hydraulic pressure is supplied to the reverse clutch 194 from the unillustrated hydraulic control circuit, for example, via an oil path formed in the hollow shaft 16.

When the forward clutch 193 is engaged, a hub provided on the engine 2 side of the first shaft 14 and the inner drum 191 are engaged to engage the engine 2 and the first shaft 14. Further, when the reverse clutch 194 is engaged, a hub provided on the engine 2 side of the hollow shaft 16 and the outer drum 192 are coupled to couple the engine 2 and the first gear 15.

Next, power transmission paths at forward and reverse speeds in the first embodiment are described with reference to FIGS. 2A and 2B.

Figure 2A:
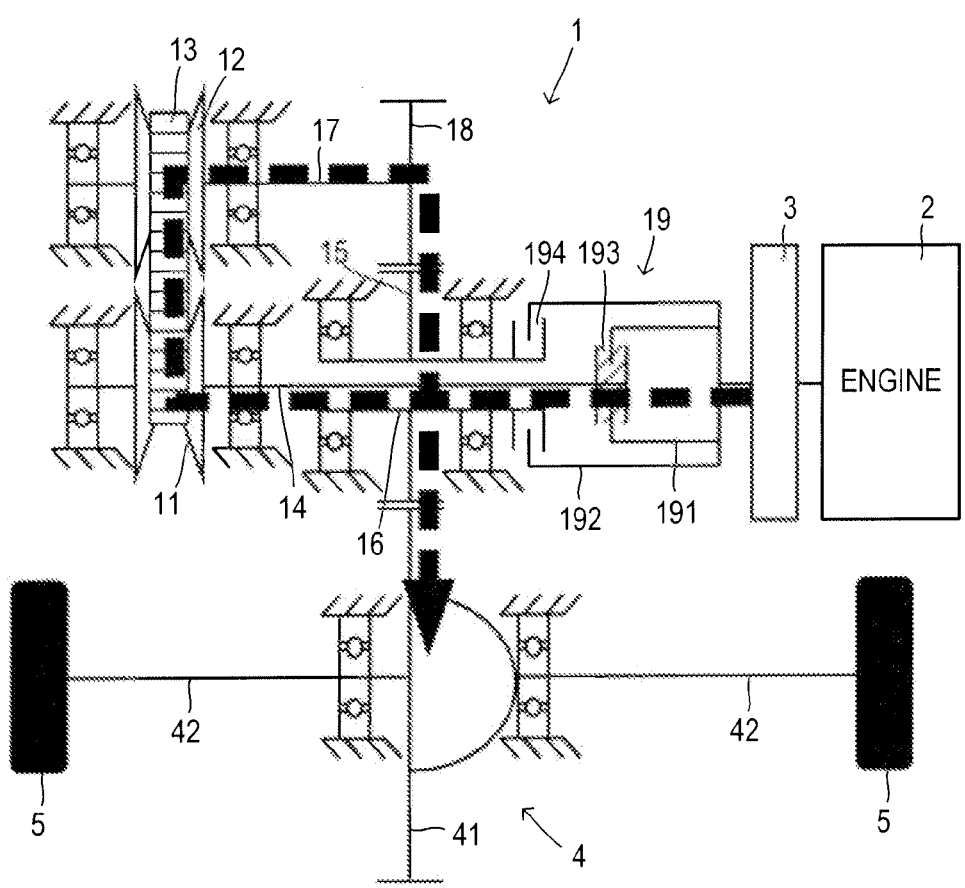
FIG. 2A is a diagram showing a power transmission path at a forward speed.

A broken-line arrow of FIG. 2A shows the power transmission path at the forward speed, which is achieved when the forward clutch 193 is engaged and the reverse clutch 194 is released.

Power of the engine 2 is transmitted to the primary pulley 11 via the starting mechanism 3, the inner drum 191 and the first shaft 14. The power transmitted to the primary pulley 11 is transmitted to the secondary pulley 12 via the belt 13, and a shift is performed according to the groove widths of the pulleys 11, 12. The power transmitted to the secondary pulley 12 is transmitted to the ring gear 41 via the second shaft 17, the second gear 18 and the first gear 15 and distributed and transmitted to the left and right drive wheels 5 by the differential mechanism 4.

Figure 2B:
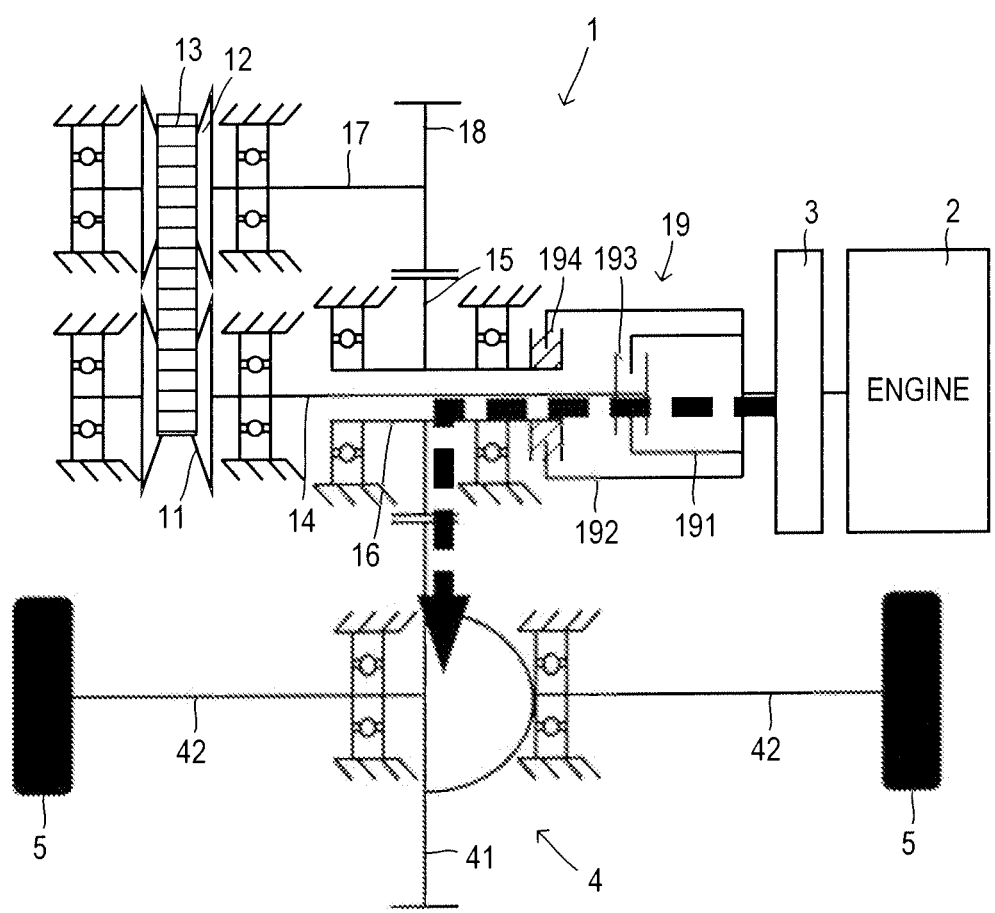
FIG. 2B is a diagram showing a power transmission path at a reverse speed.
Figure 3A:
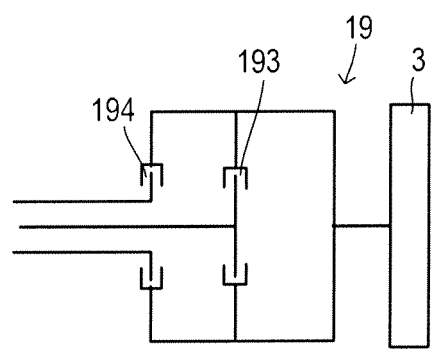
FIGS. 3A to 3D are diagrams showing variations of a clutch unit.
Figure 3B:
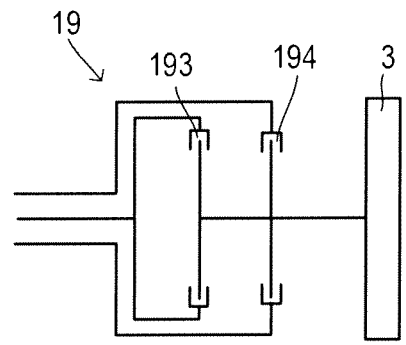
Figure 3C:
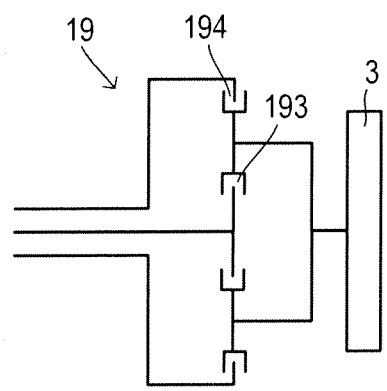
Figure 3D:
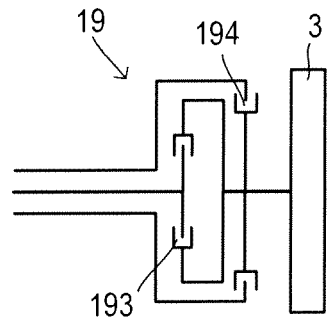

On the contrary, a broken-line arrow of FIG. 2B shows the power transmission path at the reverse speed, which is achieved when the reverse clutch 194 is engaged and the forward clutch 193 is released.

Unlike at the forward speed, power of the engine 2 is transmitted to the ring gear 41 via the starting mechanism 3, the outer drum 192 and the first gear 15 and distributed and transmitted to the left and right drive wheels 5 by the differential mechanism 4. Rotational directions of the drive wheels 5 in this case are opposite to those at the forward speed.

As just described, the CVT 1 according to the first embodiment uses no planetary gear mechanism, but enables forward/reverse switching by engaging and releasing the forward clutch 193 and the reverse clutch 194. The number of parts is less as compared with the conventional technology disclosed in JP2001-330095A, and miniaturization, weight saving and cost reduction of the CVT 1 are possible.

Further, the number of shafts is less as compared with the conventional technology disclosed in JP2001-330095A, which is advantageous in layout (six shafts including the drive shaft in JP2001-330095A, whereas three shafts including the drive shaft 42 in the first embodiment) and enables miniaturization of the CVT 1 by reducing a dimension in a direction perpendicular to the axial direction.

In the first embodiment, structures shown in FIGS. 3A to 3D may be adopted as the structure of the clutch unit 19 without being limited to the structure shown in FIG. 1.

Next, a second embodiment is described.

Figure 4:
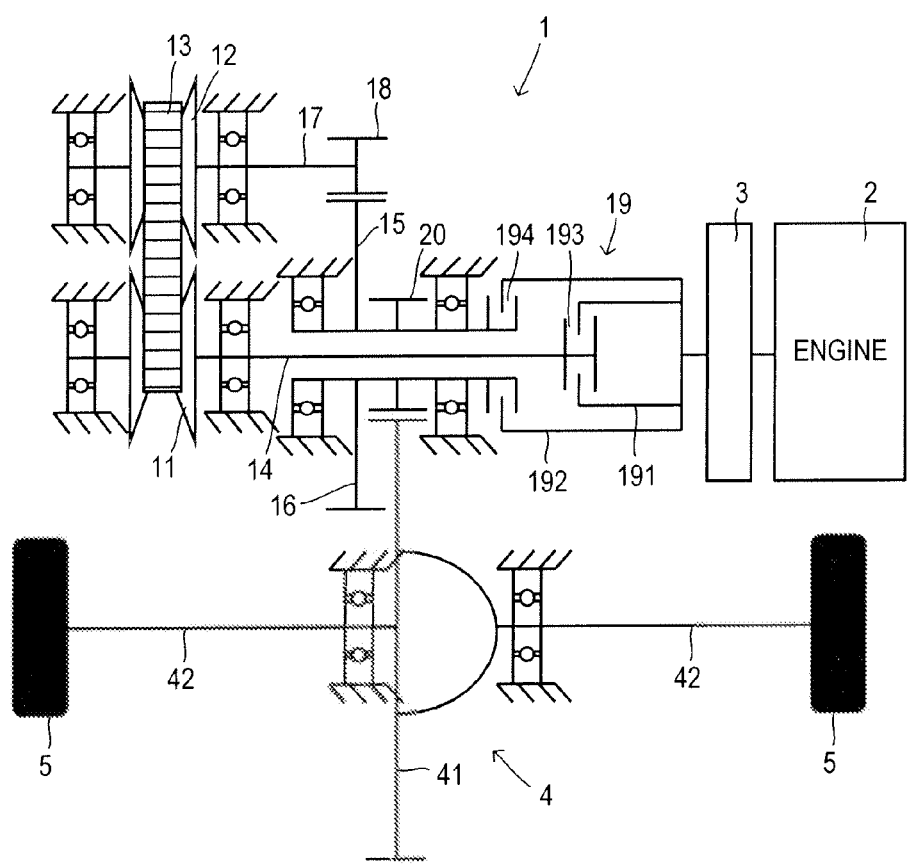
FIG. 4 is a schematic construction diagram of a vehicle equipped with a continuously variable transmission according to a second embodiment.

FIG. 4 shows a schematic construction of a vehicle equipped with a CVT 1 according to the second embodiment. The first gear 15 functions as the output gear in the first embodiment, whereas a third gear 20 provided integrally rotatably with a first gear 15 functions as the output gear in the second embodiment.

Specifically, the first gear 15, a hollow shaft 16 and the third gear 20 are mounted on a first shaft 14 to be relatively rotatable with respect to the first shaft 14. The third gear 20 has fewer teeth than the first gear 15 and is fixed to the outer periphery of the hollow shaft 16 in parallel to the first gear 15. Instead of the first gear 15, the third gear 20 is engaged with a ring gear 41 of the differential mechanism 4.

Other constructions are common to the first embodiment and not described by assigning common reference signs to the drawing. That the structures shown in FIGS. 3A to 3D may be adopted as the structure of the clutch unit 19 also holds.

In the second embodiment, a larger speed reduction ratio can be achieved at a reverse speed than in the first embodiment by including the third gear 20. Other functions and effects are not described since being the same as in the first embodiment.

Next, a third embodiment is described.

Figure 5:
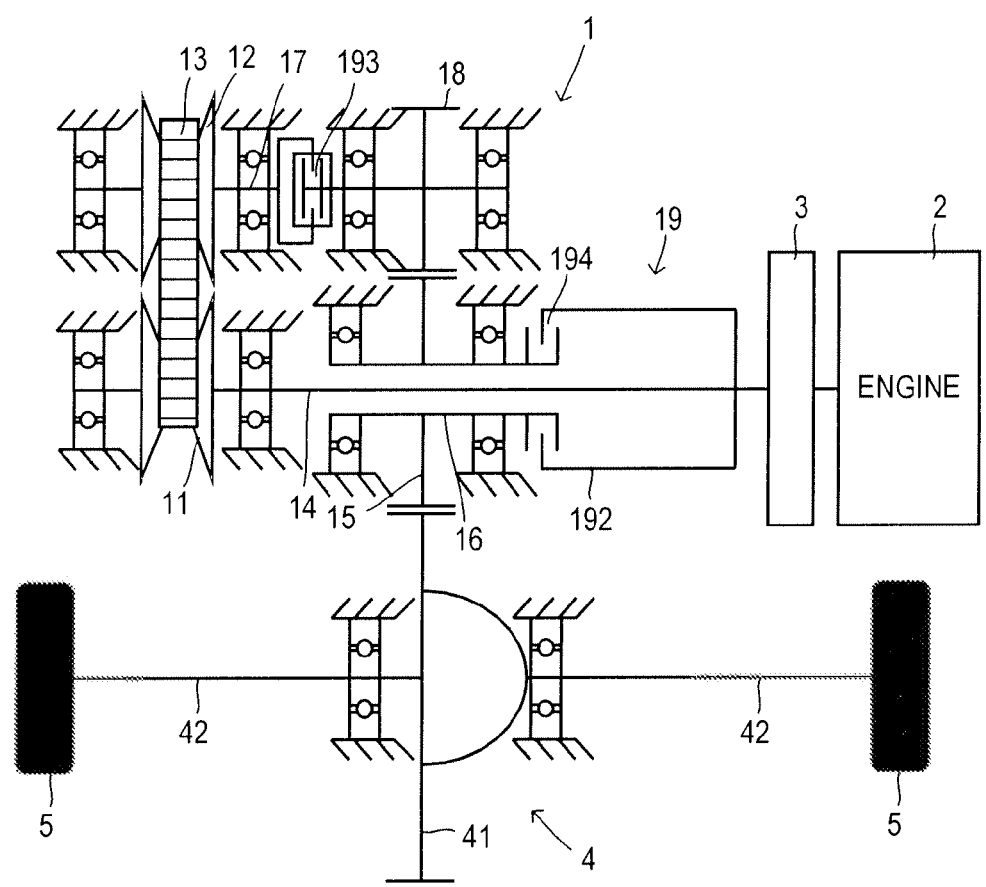
FIG. 5 is a schematic construction diagram of a vehicle equipped with a continuously variable transmission according to a third embodiment.

FIG. 5 shows a schematic construction of a vehicle equipped with a CVT 1 according to the third embodiment. The third embodiment differs from the first embodiment in the following points.

In the third embodiment, a clutch unit 19 has a single-drum structure composed of only an outer drum 192 and power of an engine 2 is directly input to a first shaft 14. Further, although being arranged on the same axis as a second shaft 17, a second gear 18 is not fixed to the second shaft 17 and supported on a transmission case by a plurality of bearings to be relatively rotatable with respect to the second shaft 17. Furthermore, a forward clutch 193 is provided between the second shaft 17 and the second gear 18 to couple the second shaft 17 and the second gear 18.

Other constructions are common to the first embodiment and not described by assigning common reference signs to the drawing.

Even with this construction, similarly to the first embodiment, forward/reverse switching is possible by engaging and releasing the forward clutch 193 and a reverse clutch 194, wherefore forward/reverse switching without the use of a planetary gear mechanism can be realized without increasing the number of parts.

The second and third embodiments may be combined and a third gear 20 integrally rotatable with the first gear 15 may be provided and caused to function as an output gear in the third embodiment.

The embodiments of the present invention have been described above. The above embodiments are merely illustration of application examples of the present invention and not of the nature to limit the technical scope of the present invention to the specific constructions of the above embodiments.

For example, although the engine 2 is included as the power source in the above embodiments, the power source may be an electric motor besides the engine 2 or a combination of the engine 2 and an electric motor.

Further, although the belt 13 is mounted between the primary pulley 11 and the secondary pulley 12 in the above embodiments, a chain may be mounted instead of the belt 13.

The present application claims a priority based on Japanese Patent Application No. 2009-281588 filed with the Japan Patent Office on Dec. 11, 2009, all the contents of which are hereby incorporated by reference.

The invention claimed is:

1. A continuously variable transmission, comprising:
   a primary pulley and a secondary pulley, the groove width of which is changeable;
   an endless flexible member mounted between the two pulleys;
   a first shaft integrally rotatably coupled to the primary pulley;
   a second shaft integrally rotatably coupled to the secondary pulley;
   a first gear mounted on the first shaft and relatively rotatable with respect to the first shaft;
   a second gear fixed on the second shaft and engaged with the first gear;
   a forward clutch for coupling a power source and the first shaft; and
   a reverse clutch for coupling the power source and the first gear.

2. The continuously variable transmission according to claim 1, further comprising an inner drum and an outer drum on the power source side of the first shaft, the outer drum housing the inner drum inside and being integrally rotatably coupled to the inner drum, wherein:
   power from the power source is transmitted to the two drums;
   the forward clutch is a clutch for coupling the inner drum and the first shaft; and
   the reverse clutch is a clutch for coupling the outer drum and the first gear.

3. The continuously variable transmission according to claim 1, further comprising a third gear mounted on the first shaft and integrally rotatable with the first gear, wherein:
   the third gear is an output gear of the continuously variable transmission.

4. A continuously variable transmission, comprising:
   a primary pulley and a secondary pulley, the groove width of which is changeable;
   an endless flexible member mounted between the two pulleys;
   a first shaft integrally rotatably coupled to the primary pulley and having power from a power source transmitted thereto;
   a second shaft integrally rotatably coupled to the secondary pulley;
   a first gear mounted on the first shaft and relatively rotatable with respect to the first shaft;
   a second gear provided on the same axis as the second shaft and relatively rotatably with respect to the second shaft and engaged with the first gear;
   a forward clutch for coupling the second shaft and the second gear; and
   a reverse clutch for coupling the power source and the first gear.

5. The continuously variable transmission according to claim 4, further comprising an outer drum provided on the power source side of the first shaft and integrally rotatably coupled to the first shaft, wherein:
   the reverse clutch is a clutch for coupling the outer drum and the first gear.

6. The continuously variable transmission according to claim 4, further comprising a third gear mounted on the first shaft and integrally rotatable with the first gear, wherein:
   the third gear is an output gear of the continuously variable transmission.

* * * * *